(12) United States Patent
Wong et al.

(10) Patent No.: US 9,896,117 B1
(45) Date of Patent: Feb. 20, 2018

(54) WELDING TABLE CART

(71) Applicants: Harry Wong, South Pasadena, CA (US); Gary Tsui, San Marino, CA (US)

(72) Inventors: Harry Wong, South Pasadena, CA (US); Gary Tsui, San Marino, CA (US)

(*) Notice: Subject to any disclaimer, the term of this patent is extended or adjusted under 35 U.S.C. 154(b) by 0 days.

(21) Appl. No.: 15/469,826

(22) Filed: Mar. 27, 2017

(51) Int. Cl.
*B62B 1/26* (2006.01)
(52) U.S. Cl.
CPC ..................... *B62B 1/26* (2013.01)
(58) Field of Classification Search
CPC ............... B62B 1/00; B62B 1/20; B62B 5/00
See application file for complete search history.

(56) References Cited

U.S. PATENT DOCUMENTS 6,412,764 B1 * 7/2002 Hebert .................. B25B 5/006
269/246

* cited by examiner

*Primary Examiner* — John Walters
*Assistant Examiner* — James Triggs
(74) *Attorney, Agent, or Firm* — Jen-Feng Lee, Esq.

(57) ABSTRACT

Present invention teaches the construction of a welding table cart that consists of a table structure and a reversible top. The welding table cart provides, among other features, a side plate, removable/adjustable bar, and a hanger tube assembly near the under portion of reversible table top, where an inner tube can be extended out from an outer tube, and provides an end-platform for added convenience. Multiple welding table carts can be joined together for increased work space.

4 Claims, 10 Drawing Sheets

WELDING TABLE CART

FIELD AND BACKGROUND OF THE INVENTION

A welding table is a known art, providing a "work bench" for working on metal objects, as well as for welding metal parts, or performing other tooling activities.

Currently on the market, there are not many portable welding work stations suitable for consumer uses. If a user needs to change the location of welding jobs that rely on a welding table, the moving around of heavy equipment creates some obstacle and logistical issues. As such, to fit different welding needs in a mobile fashion becomes a time-consuming task and more often than not requires more than one person to handle the work.

Present invention sought to create certain advantage and convenience by providing improvement over a traditional welding table, making it more versatile and easier for use, with more adaptable functionalities.

SUMMARY OF THE INVENTION

The invention relates to a welding table made into a movable cart, having add-on structures that provide increased facility and versatility for users. The welding table cart has two major components: a table structure and a reversible table top.

In a preferred embodiment, the table structure further has four leveling feet, each has a height adjustable knob at the bottom. A chassis is made at a location towards the lower part of the leveling feet. The chassis provides for anchoring points to attach a plurality of locking casters which allow easy moving around of the welding table cart. The locking casters also allows the caster wheels to be locked, as desired, if consumers want to restrict the movement of the welding table cart after it is set to a fixed location.

The reversible table top is made in a way that it can be flipped over and both sides will be used in the same manner, thus increasing the useful life of the welding table cart.

The top portion of the table structure can be made from a grid-like frame. A plurality of metal hooks and hex head screws are used to secure the reversible table top in place, sitting on top of the grid-like frame of the table structure.

In one embodiment, a hanger tube assembly is made to the under portion of reversible table top when installed on the table structure. The hanger tube assembly consists of an outer tube and an inner tube so that the inner tube fits snugly and slidably inside the outer tube.

Present invention allows multiple welding table carts to be joined together by a square plate, using four threaded holes and matching screws. The square plate is put under the reversible table top, so it will not affect the effectiveness of the increased work space when linking multiple units together. More than one square plate can be used as desired by users to put multiple welding table cart of present invention as desired.

DESCRIPTION OF THE DRAWINGS

The accompanying drawings, which are incorporated in and constitute a part of this specification, illustrate the preferred embodiments of the invention and together with the description, serve to explain the principles of the invention.

A brief description of the drawings is as follows:

FIG. 7 shows the hanger tube assembly, with the inner tube partially retracted in.

DETAILED DESCRIPTION OF THE PREFERRED EMBODIMENT

Figure 1:
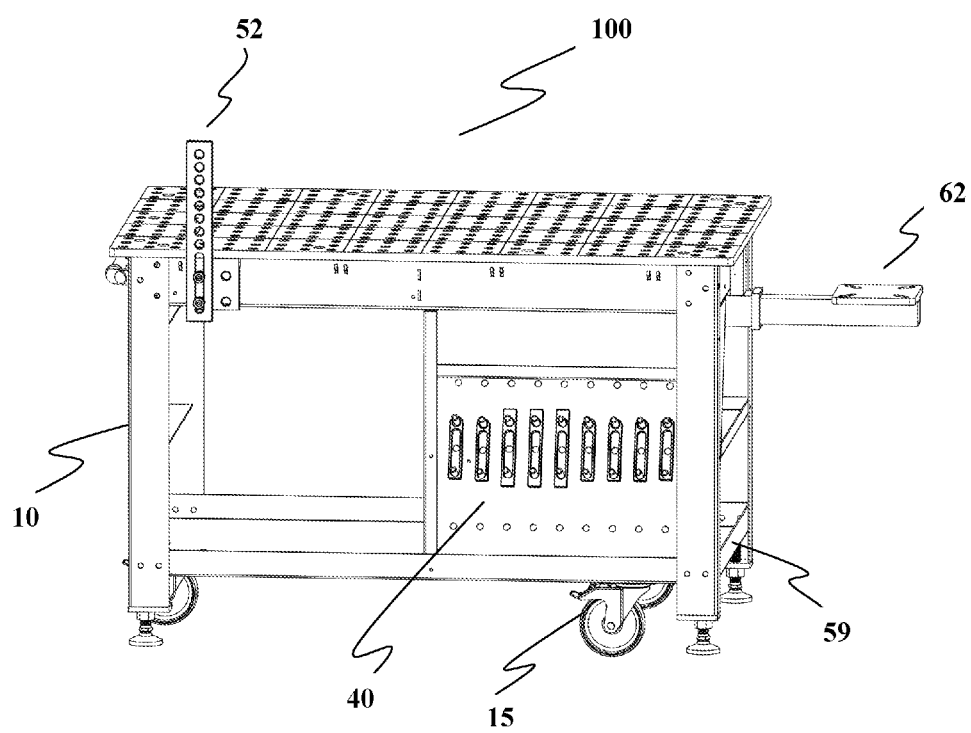
FIG. 1 shows a perspective view of the overall welding table cart of present invention.

Reference FIG. 1, a welding table cart 100 is shown.

Figure 9:
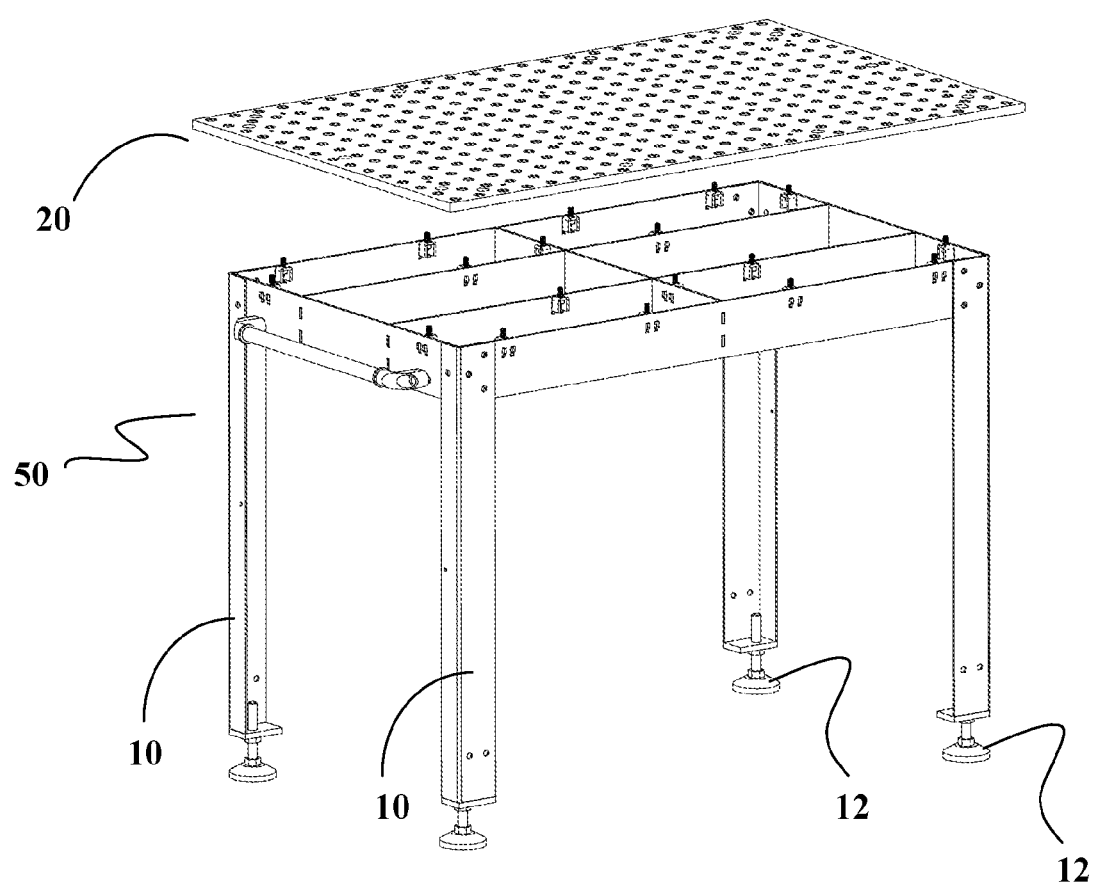
FIG. 9 shows the exploded view of a table structure with the reversible table top.

The welding table cart 100 is comprised of two major components: a table structure 50 and a reversible table top 20, as shown in FIG. 9. The table structure 50 further has 4 leveling feet 10. At the bottom of each of the leveling feet 10, a height adjust knob 12 is put in place to provide the adjustability needed for the leveling purpose.

A chassis 59 is made at a location towards the lower part of the leveling feet 10. The chassis 59 provides for the anchoring points to attach a plurality of locking casters 15 which allow easy moving around of the welding table cart 100.

The reversible table top 20 is made in a way that it can be flipped over and both sides will be used in the same manner, thus increasing the useful life of the welding table cart.

Figure 2:
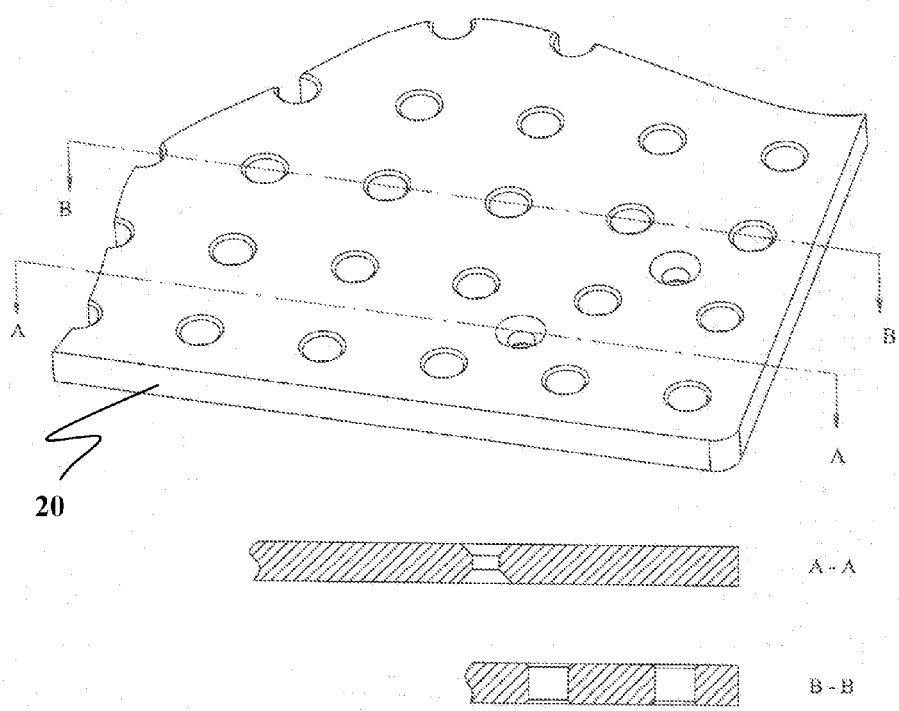
FIG. 2 shows the reversible table top and the profiles of the through holes.

As shown in FIG. 2, two sets of through holes are made on the reversible table top 20, denoted as A-A and B-B, based upon the cross-section line notations. Both sets of through holes are made to be top-bottom symmetrical, fitting the purpose of being reversible. The different A-A and B-B profiles provide the versatility to accommodate different screws, bolts, or other locking mechanisms, and for any other desirable usages.

Figure 3:
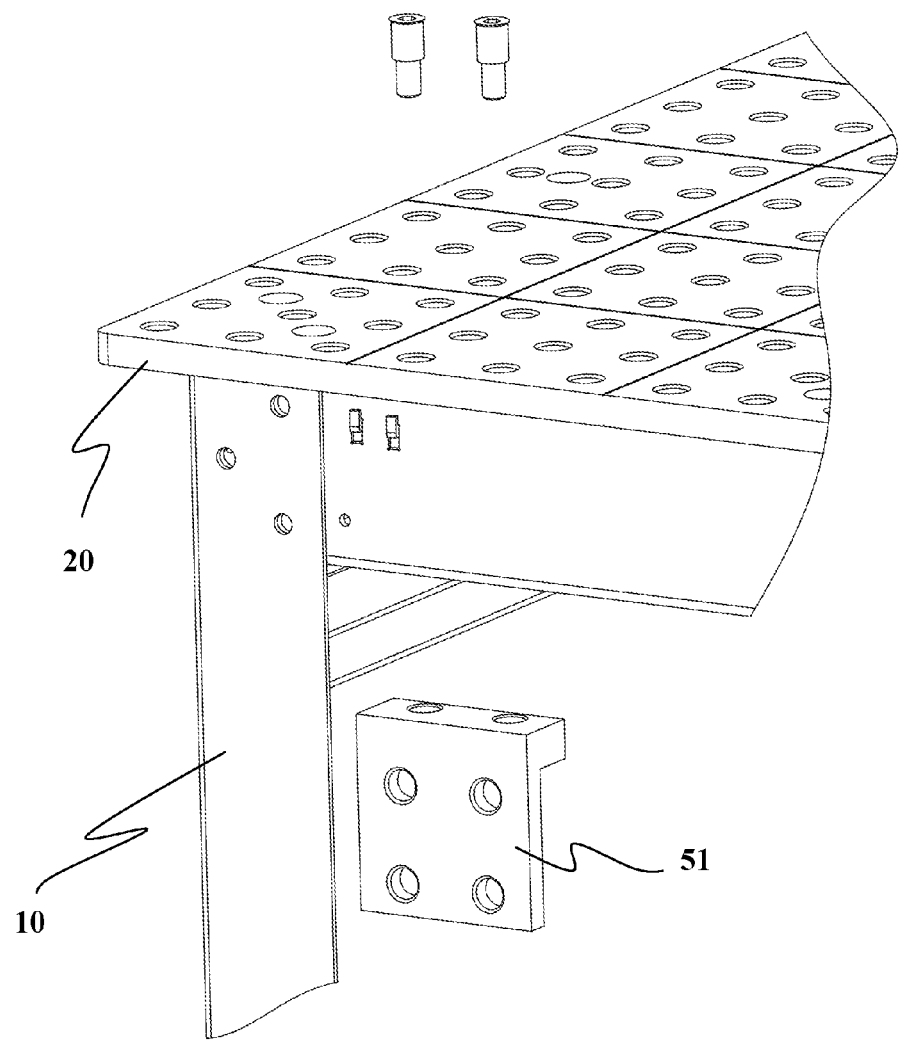
FIG. 3 shows a cutout view of a side plate, detached from the table structure.
Figure 4:
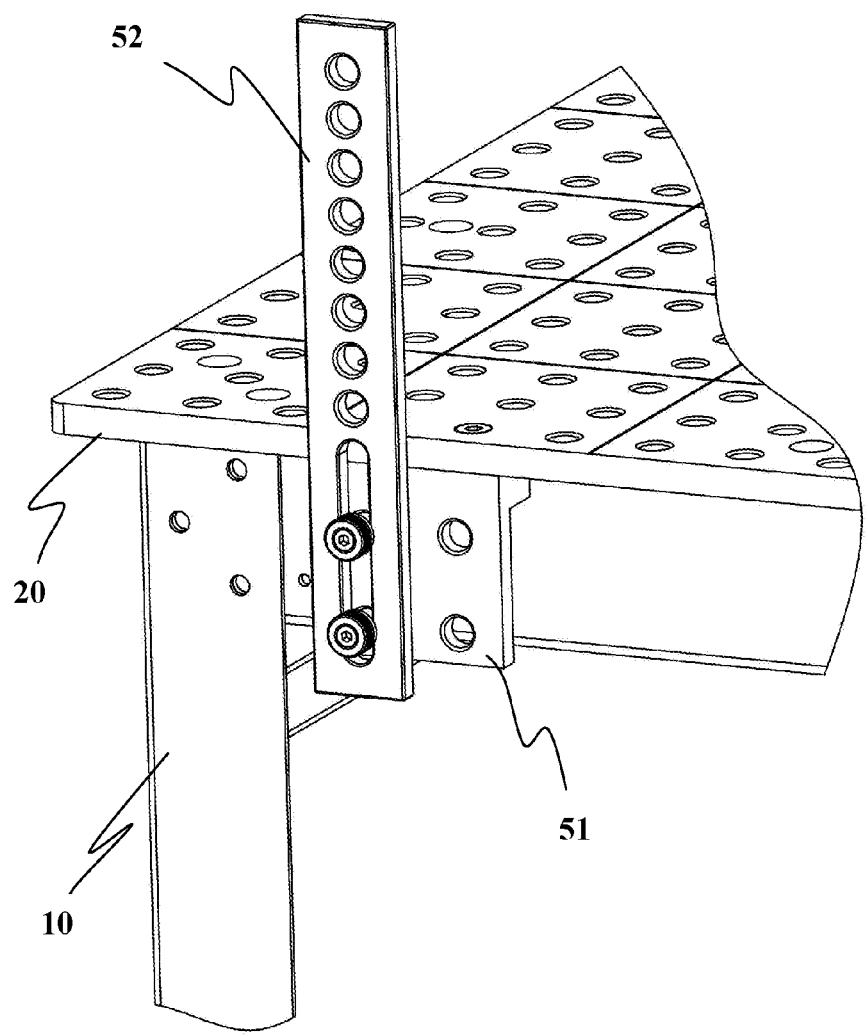
FIG. 4 shows the side plate along with an adjustable bar.

As shown in FIGS. 3 and 4, a side plate 51 is made to the side of the table structure 50. The side plate 51 has a plurality of holes to allow easy screwing in of additional parts, such as a removable and adjustable bar 52, as shown.

Figure 10:
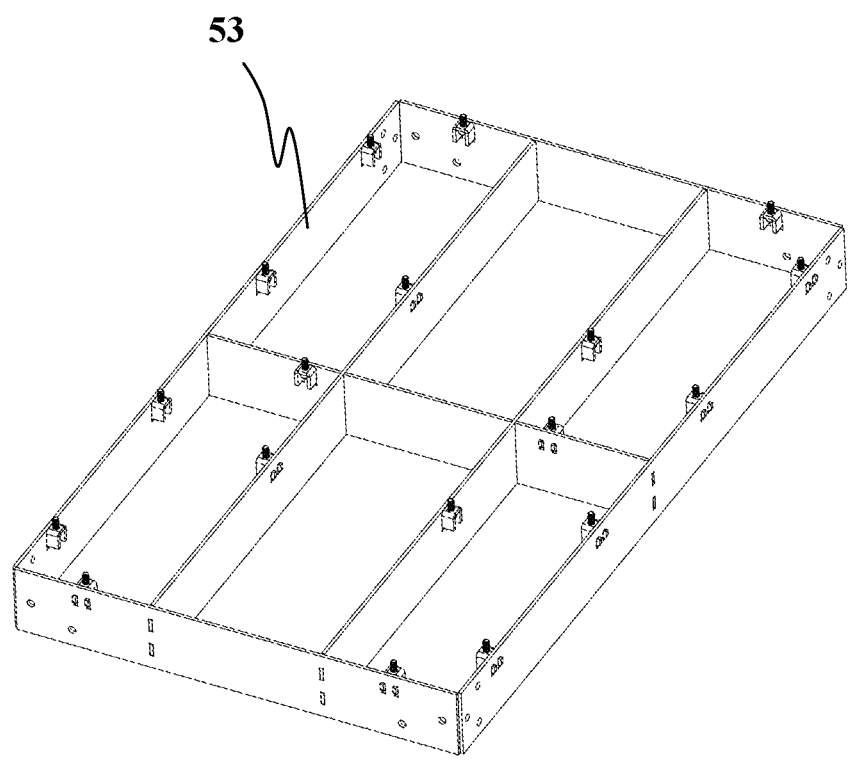
FIG. 10 shows the grid-like frame of the table structure.
Figure 11:
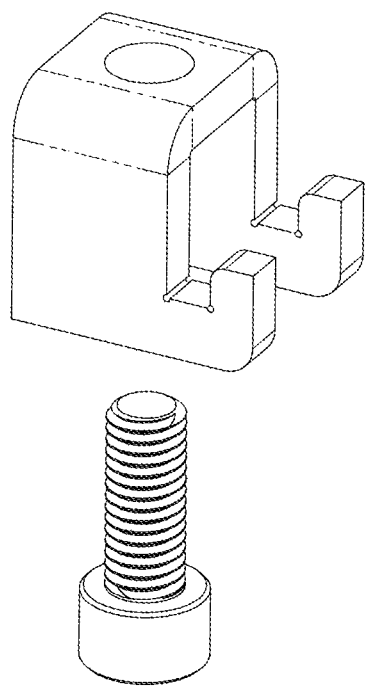
FIG. 11 shows the metal hooks and screws used to secure the reversible table top to the table structure.

The top portion of the table structure 50 can be made from a grid-like frame 53, as shown in FIGS. 9 and 10. A plurality of metal hooks and hex head screws are used to secure the reversible table top 20 in place, making it sit securely on top of the grid-like frame 53 of the table structure 50. In addition, the metal hooks and hex head screws also help to keep the shape of the table top 20, less prone to deformation. The metal hooks and screws are shown in FIG. 11.

Figure 5:
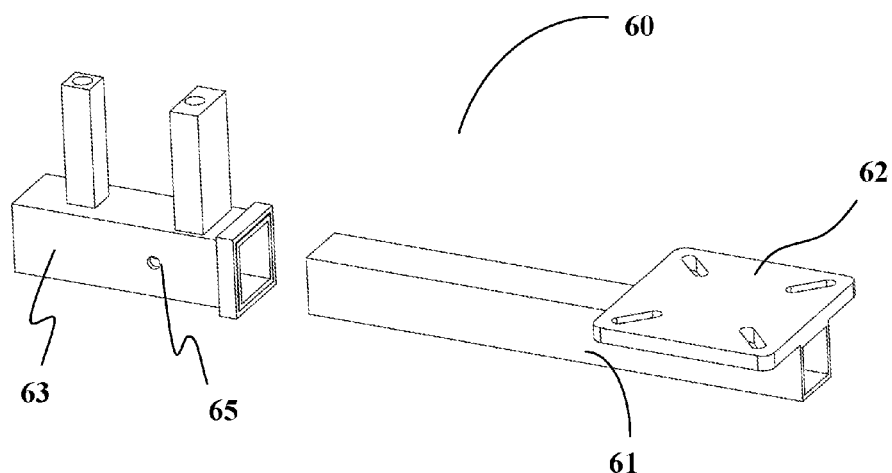
FIG. 5 shows the hanger tube assembly, with the inner tube completely out.
Figure 6:
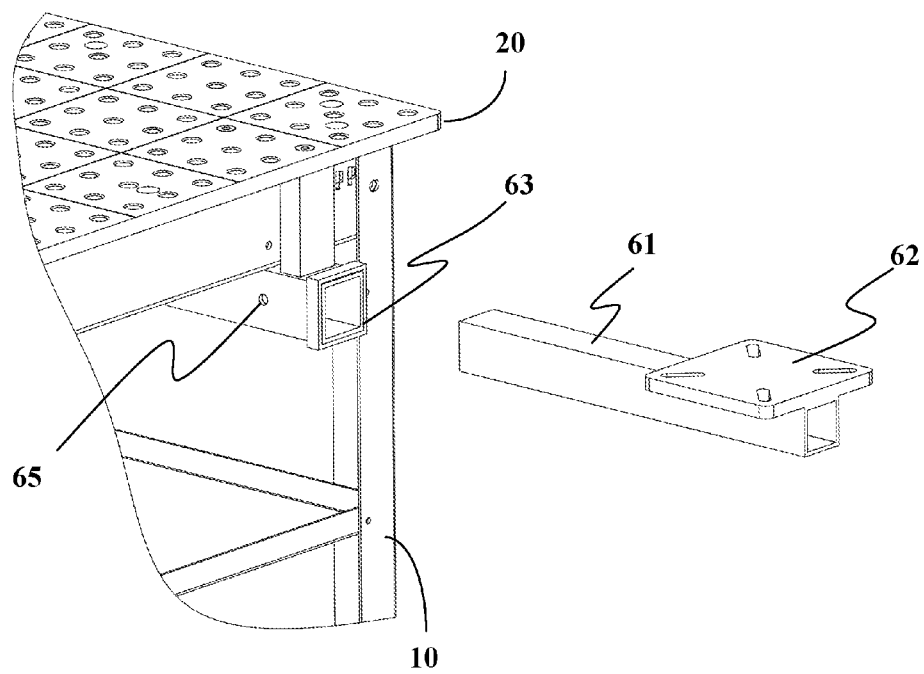
FIG. 6 shows the hanger tube assembly, installed to the under portion of the reversible top, with the inner tube completely out.
Figure 7:
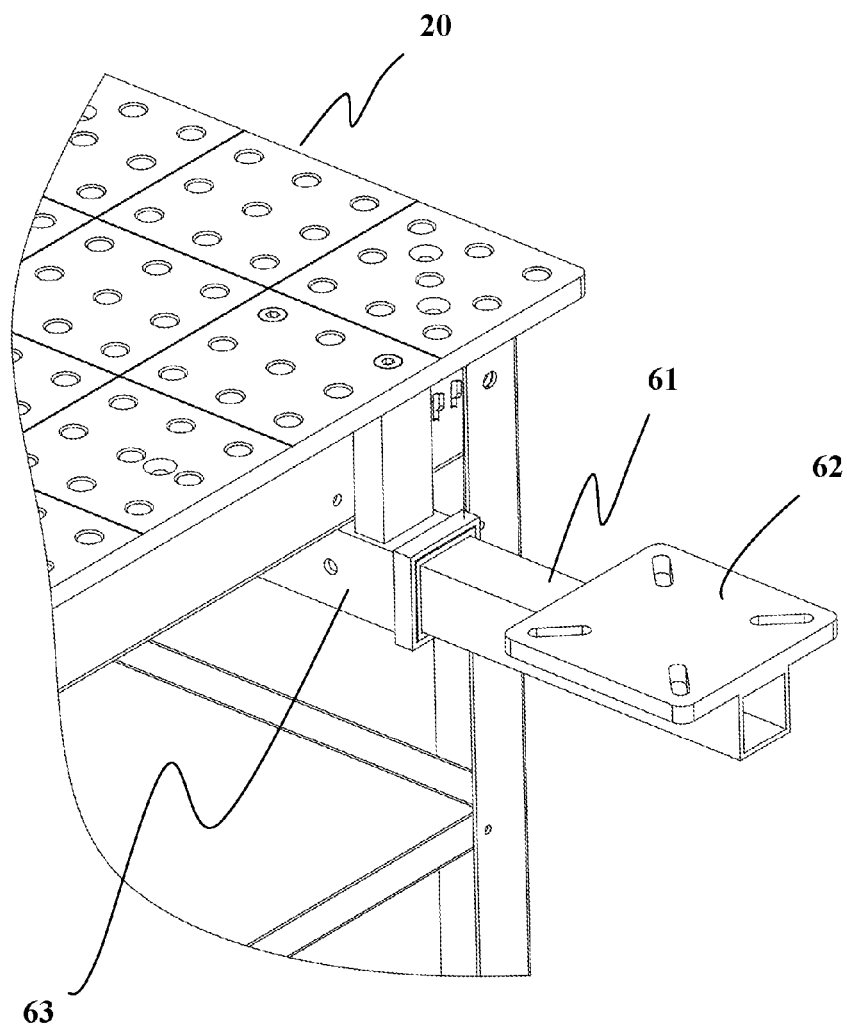

A hanger tube assembly 60, as shown in FIGS. 5, 6, and 7, is made to the under portion of reversible table top 20 when installed on the table structure 50. The hanger tube assembly 60 consists of an outer tube 63 and an inner tube 61, so that the inner tube 61 fits snugly and slidably inside the outer tube 63.

As shown in FIGS. 5, 6, and 7, the inner tube 61 is extendable from sliding out within outer tube 63. When fully retracted, only an end-platform 62 at the end of the inner tube 61 is visible. The end-platform 62 may contain a plurality of holes or grooves, allowing additional tools or objects to be secured by screws or other suitable means.

At the side of the outer tube 63, a screw hole 65 is provided as a means of setting the inner tube 61, and the end-platform 62, in place as desired by users, by a matching screw, or other suitable means.

At the side of the welding table cart 100 and next to the side of a leveling foot 10, an optional tool hanging panel 40 can be added to increase the versatility of the cart 100 of present invention.

Figure 8:
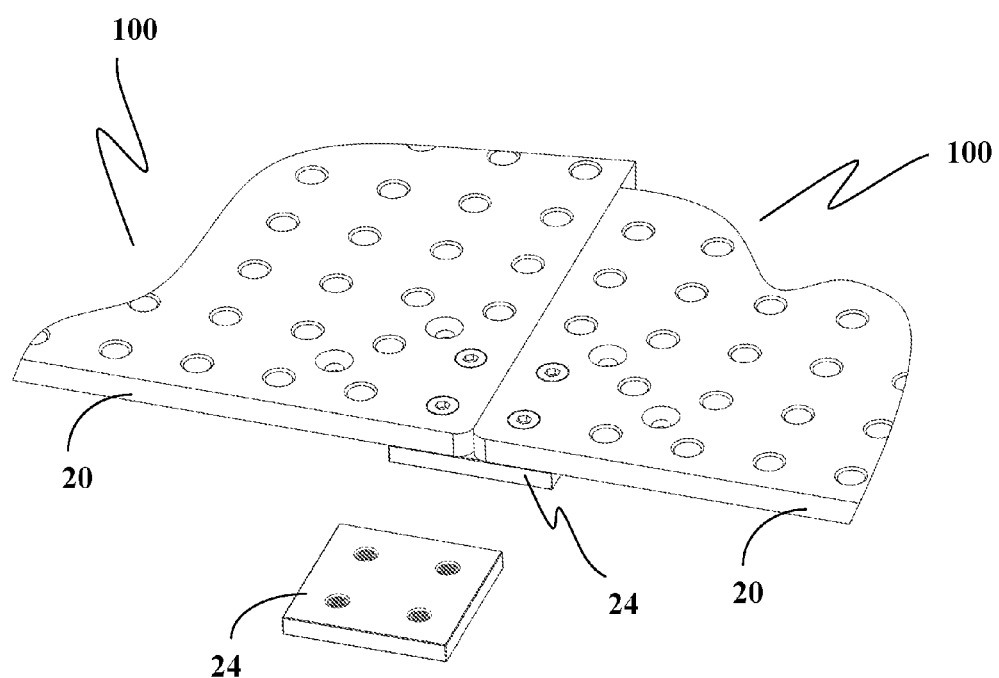
FIG. 8 shows a cutout view of two welding table cart joined together by using a square plate.

FIG. 8 shows that multiple welding table carts of present invention can be joined together by a square plate 24, with four threaded holes and matching screws. The square plate 24 is put under the reversible table top 20, so it will not affect the effectiveness of the increased work space when linking multiple units together. More than one square plate 24 can be used as desired by users to put multiple welding table cart 100 of present invention as desired.

The invention discussed herein is not limited by the disclosures and illustrations specifically contained herein, which are only for purpose of enabling the invention contemplated. As long as any additional implementations are within the range of coverage enabled by the disclosure, they are considered to be within the scope of the present invention.

The invention claimed is:

1. A welding table cart, comprising:
a table structure with four adjustable and leveling feet;
a reversible table top;
a side plate with a removable and adjustable bar;
a chassis attached to the lower portions of the four feet;
a plurality of locking casters attached to said chassis; and
a hanger tube assembly that contains an outer tube and an extendable and slidable inner tube having an end-platform, wherein said assembly is fitted to the table structure under said reversible table top, and wherein the inner tube of hanger tube assembly is made to the length that is selectively completely hidden within the outer tube leaving only a small segment of the inner tube with end-platform attached.

2. The welding table cart of claim 1, wherein the table structure further includes a tool hanging panel located to the side of the cart.

3. A welding table cart, comprising:
a table structure with four adjustable and leveling feet;
a reversible table top;
a side plate with a removable and adjustable bar;
a chassis attached to the lower portions of the four feet;
a plurality of locking casters attached to said chassis;
a hanger tube assembly that contains an outer tube and an extendable and slidable inner tube having an end-platform, wherein said assembly is fitted to the table structure under said reversible table top;
wherein the inner tube of hanger tube assembly is made to the length that is selectively completely hidden within the outer tube leaving only a small segment of the inner tube with end-platform attached; and,
wherein the reversible table top contains pre-made through holes of two different profiles, resulting in multi-functional use and connection between objects placed on the table top or connection of additional table tops.

4. The welding table cart of claim 3, wherein the top portion of the table structure forms a grid-like frame for placing the reversible table top, said reversible table top is secured by a plurality of metal hooks and hex screws.

* * * * *